United States Patent [19]

Taylor

[11] 4,128,127
[45] Dec. 5, 1978

[54] SWIVEL CONNECTOR

[75] Inventor: Donald F. Taylor, Dallas, Tex.

[73] Assignee: Otis Engineering Corporation, Dallas, Tex.

[21] Appl. No.: 835,872

[22] Filed: Sep. 23, 1977

[51] Int. Cl.² .................. E21B 43/00; F16L 39/00
[52] U.S. Cl. ............................... 166/105; 285/136
[58] Field of Search .................. 285/136; 166/105, 68;
175/215; 64/2 R, 2 P

[56] References Cited

U.S. PATENT DOCUMENTS

| 2,874,780 | 2/1959 | Gertzen | 166/105 |
| 3,957,291 | 5/1976 | Edling et al. | 285/136 |

FOREIGN PATENT DOCUMENTS 27491 of 1910 United Kingdom .................. 285/136

*Primary Examiner*—Ernest R. Purser
*Attorney, Agent, or Firm*—Vinson & Elkins

[57] ABSTRACT

A swivel connector for joining well tools or similar apparatus with a main longitudinal bore or passage through which well operations may be conducted and at least one separate passage for conducting fluid therethrough which extends through the swivel joint and is not blocked by rotation or pivoting of the swivel joint. This abstract is neither intended to define the invention of the application which, of course, is measured by the claims, nor is it intended to be limiting as to the scope of the invention in any way.

9 Claims, 4 Drawing Figures

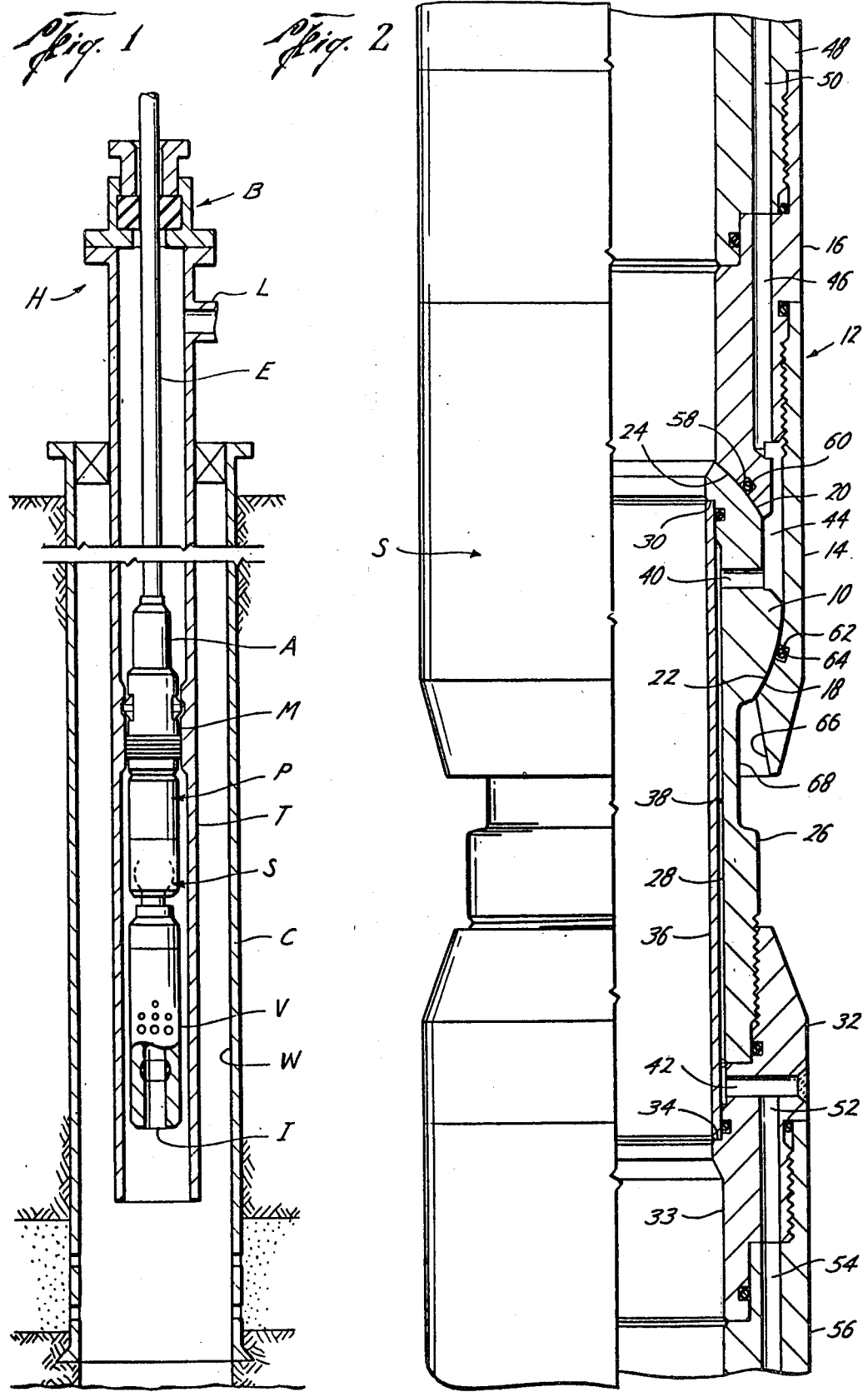

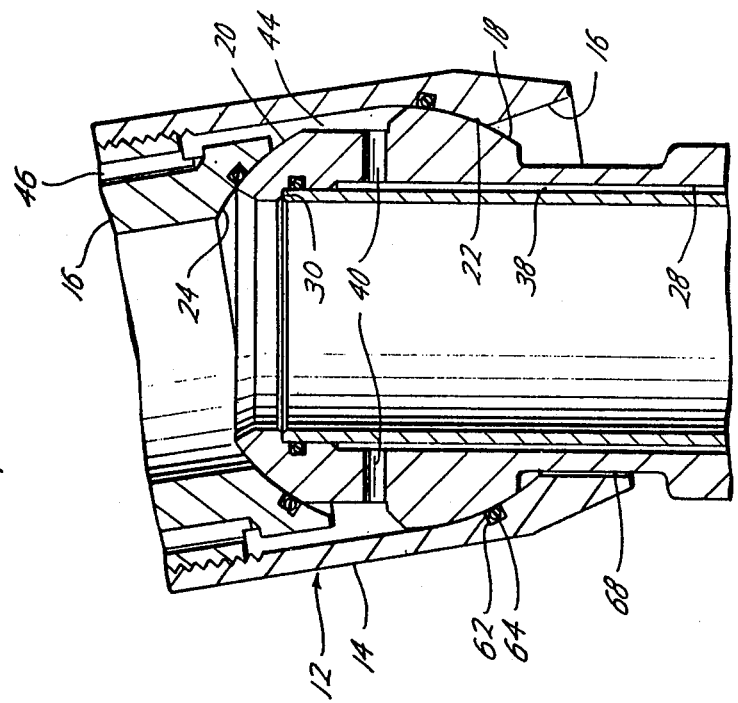
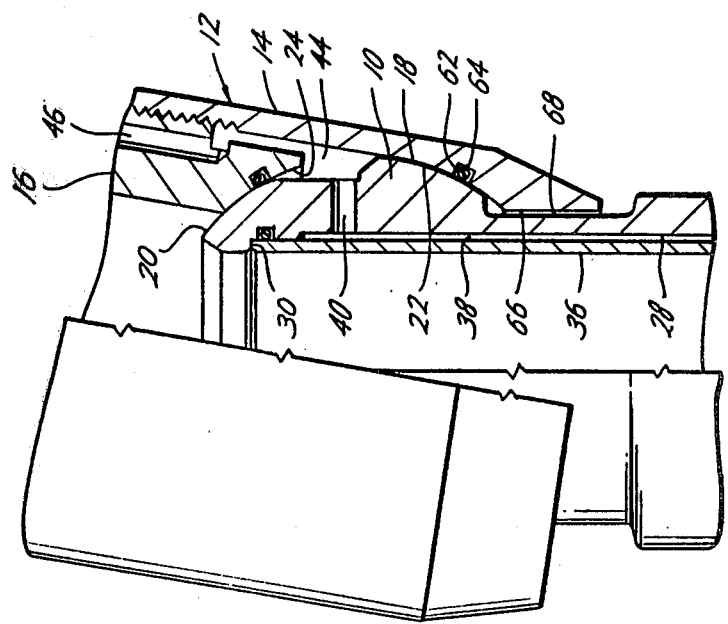

SWIVEL CONNECTOR

BACKGROUND OF THE INVENTION

This invention relates to swivel or ball joints for a well string to provide a continuous control or operating fluid passage therethrough in addition to the main bore through which drilling operations are performed.

In the prior art, multi-passage connectors or joints have been utilized which have tubes connecting to opposite ends of passages through the ball, such is shown in U.S. Pat. No. 3,957,291. To maintain continuous flow through the main bore and additional passages, the bending and rotational movement of the joint was limited because the tubes have a limited length and flexibility and rotation is limited to avoid misconnection of tubes across the joint. In addition, the prior art has conduits spanning the exterior of the joint which are not protected by a housing, are bulky and have limited flexibility. These exterior conduits can be subject to breakage by other tools being used or if the joint is in a marine riser pipe by operations around a riser pipe.

SUMMARY

The invention relates to ball-type swivel connectors or joints.

An object of this invention is to provide an improved swivel connector with a communication separate from the central bore around the joint which is not interrupted by pivotal and rotational movement of the joint.

A further object of this invention is to provide an improved swivel connector which does not have loose hoses or tubes spanning the joint.

BRIEF DESCRIPTION OF THE DRAWINGS

These and other objects and advantages of the present invention are hereinafter set forth and explained with respect to the drawings wherein:

FIG. 1 is a schematic elevation view showing the improved swivel connector positioned in a well string.

FIG. 2 is a view partially in section and partially in elevation of the swivel connector.

FIG. 3 is a view partially in section and partially in elevation illustrating the pivoting of the swivel connector.

FIG. 4 is a similar sectional view illustrating the pivoting of the swivel connector in the opposite direction to FIG. 3.

DESCRIPTION OF THE PREFERRED EMBODIMENTS

The improved swivel connector of the present invention is illustrated in FIG. 1 positioned in a well bore W defined by the casing C with the swivel connector S connected between a pump intake I within the tubing string T and the pump P. The pump P together with the swivel joint S, the intake I and poppet valve V are supported within the tubing string T by the lock mandrel M. The pump motor A is positioned above the locking mandrel M and is connected to the surface by the electric cable E which extends outward through the stuffing box B at the wellhead H. The tubing string T has a branch line L which connects to production equipment (not shown) and through which fluid pumped from the lower portions of the well bore W is produced.

In FIG. 1, the improved swivel connector S of the present invention is shown in a production string but it may be connected in any other type of well string or, if desired, may be the swivel connection of a marine riser pipe.

The improved swivel joint of the present invention is best seen in FIG. 2. The ball member 10 is supported by the swivel socket 12 and allows both rotational and pivotal movement thereof. The swivel socket 12 includes the exterior housing 14 and the interior or swivel cap 16 both of which are tubular in shape. The ball member 10 has a pair of generally spherical surfaces 18 and 20 on its upper end which engage within the internal seating surfaces 22 of the housing member and the seating surface 24 on the socket member or swivel cap 16. Thus, when housing 14 is threaded onto socket member 16 with the ball member surfaces 18 and 12 therebetween, the surfaces 18 and 20 of the ball member 10 engage and seat upon the seating surfaces 22 and 24 of the housing 14 and the socket member 16 so that a pivotal and rotational joint is formed.

The ball member 10 includes the tubular leg 26 extending therefrom and having a central bore 28. Further, the ball member includes an internal shoulder 30 which faces in the downward direction. The tubular connector 32 is suitably connected to the lower end of the tubular leg 26. Tubular connector 32 has an internal bore 33 and defines the internal upwardly facing shoulder 34. Sleeve 36 is positioned within the bores of ball member 10 and tubular connector 32 between the shoulders 30 and 34. The exterior of sleeve 36 is spaced a short distance from the walls of bore 28 to form an annular passageway 38 sealed from the central bore through the swivel connection S but providing communication from the radial port 40 in the ball member 10 to the radial port 42 in the connector 32.

The port 40 communicates from the chamber 44 surrounding the ball member 10 between the spherical surfaces 18 and 20 and communicates with the longitudinal passage or passages 46 in socket member 16. The section 48 connected above the socket member 16 has at least one passage 50 which is in communication with the passage 46. To maintain this communication, the section 48 should be keyed so that the passages are in registry or, if desired, a small annular passage may be provided at the intersection between the section 14 and the socket member 16 so that where a plurality of passages 46 and 50 are in use, they are maintained in communication with each other regardless of their respective positions.

The passageway 52 is provided in the connector 32 and extends from its intersection with the port 42 downwardly and is in communication either through registry with the passageway 54 in the lower sub 56 or through an annular chamber (not shown) at the intersection between connector 32 and the sub 56. Suitable seal rings are provided to isolate the passageway which provides communication through the joint independent of the central bore through the joint. This passageway includes the passage 50 in the section 48, the passage 46 in socket member 16, the chamber 44 surrounding the ball member 10, the port 40, the annular chamber 38, the port 42, the passageway 52 in the connector 32 and the passageway 54 in lower sub 56. Groove 58 is provided in the spherical seating surface 24 of the socket member 16 for receiving the O-ring 60 which seals against the spherical surface 20 of the ball member 10. Also, groove 62 is provided in the surface 22 of the housing 14 to receive the O-ring 64 which seals against the spherical surface 18 of the ball member 10. These seals prevent leakage of fluid from the chamber 44.

FIGS. 3 and 4 show the pivotal movement of the improved swivel joint of the present invention at opposite extremes of its movement. As can be seen from this movement, the O-ring seals 60 and 64 are held in sealing engagement respectively with the surfaces 20 and 18 whereby the communication from the chamber 44 to the port 40 is not interrupted by this movement of the swivel joint. Also, other seals are provided as shown so that the separate passage through the joint is sealed at each joint.

From the foregoing, it can be seen that the present invention provides an improved ball-type swivel connector having communication separate from the central bore of the structure through the joint which communication is not interrupted by the pivotal or rotational movement of the joint. The housing 14 is provided with the tapered surface 66 which is adapted to engage the exterior surface 68 of ball member 10 when the preselected limit of the angle of pivoting of the ball joint has been reached.

What is claimed is:

1. A swivel connector, comprising:
   a ball member having a tubular leg extending therefrom, an exterior generally spherical surface on one end, and a central bore extending through said tubular leg and said one end;
   a port defined in said ball member at a point intermediate of said spherical surfaces so that spherical surfaces are above and below the port;
   a swivel cap having a bore in communication with said central bore through said ball member and a first seating surface engaging said ball member;
   a tubular housing having an inner second seating surface engaging said ball member and surrounding said swivel cap and said ball member, said tubular leg extending through said housing;
   means for retaining said seating surfaces of said swivel cap and said tubular housing in firm engagement with said ball member's generally spherical surfaces and permitting pivotal and rotational movement of said cap and housing relative to said ball member;
   an annular chamber defined by said ball member, said swivel cap and said housing in communication with the exterior of said ball port during said pivotal and rotational movement;
   means for sealing said annular chamber from said central bore during said pivotal and rotational movement;
   means for communicating with said annular chamber, contained within said swivel cap and said housing, to provide fluid communication from beyond said cap and said housing to said chamber;
   a passage in communication with said ball member port separate from said central bore, and extending through said tubular leg; and
   means for limiting said pivotal movement of said swivel cap and said housing with respect to said ball member to maintain communication between said ball port and said communication beyond said cap and said housing.

2. A swivel connector as recited in claim 1 comprising:
   said ball member contains a plurality of ports in communication with said annular chamber.

3. A swivel connector as recited in claim 1 wherein said means for communicating with said annular chamber to provide fluid communication from beyond said cap includes a plurality of passages within said swivel cap separate from said swivel cap bore.

4. A swivel connector comprising:
   a ball member having a generally tubular extension portion and a ball portion with generally spherical surfaces with the central longitudinal bore extending through said portions for fluid communication;
   a sleeve within said central bore extending at least partially through said ball portion and spaced inwardly from the interior of said ball member to provide an annular sleeve passage;
   said ball portion having at least one ball port for fluid communication to said sleeve passage;
   a swivel cap with a seating surface seated on said ball portion and having a central passage in communication with said ball member central bore;
   a housing surrounding said ball member and said swivel cap;
   an inner seating surface in said housing engaging the outer spherical surface of said ball;
   said swivel cap connecting to said housing to retain the seating surfaces of said swivel cap and said housing in sealing engagement against said ball member and permitting pivotal and rotational movement of said housing relative to said ball member;
   an annular chamber defined between said ball member and said housing adjacent said ball passage;
   said chamber providing fluid communication with said ball passage during said pivotal and rotational movement;
   at least one passage extending from said annular chamber in the direction away from said sleeve means; and
   a stop surface on said housing adapted to engage said ball member to limit the pivotal movement of said housing and said swivel cap relative to said ball member.

5. A swivel connector as recited in claim 4 further comprising:
   an annular connector connected to said housing;
   said annular connector provided with a port in communication with said sleeve passage; and
   means for communicating with said port to provide fluid flow beyond said sleeve passage.

6. A swivel connector as recited in claim 5 wherein the upper portion of said sleeve abuts an annular interior shoulder of said ball member bore and the lower portion of said sleeve abuts an annular interior shoulder of said connector.

7. A swivel connector as recited in claim 4 wherein said passage extending from said annular chamber includes a plurality of passages provided within the wall of said swivel cap.

8. A swivel connector as recited in claim 7 further comprising:
   a mandrel with a central bore connected to said swivel cap;
   said mandrel provided with a plurality of longitudinal passages separate from said central bore; and
   said mandrel passages being in alignment with said swivel cap passages.

9. A well production apparatus, comprising:
   a production tubing string;
   a pump;

a locking mandrel connected to said pump and supporting said pump within said string;

a swivel joint connected to said pump said swivel joint including;

a ball member having a tubular leg extending therefrom, an exterior generally spherical surface on one end, and a central bore extending through said tubular leg and said one end;

a port defined in said ball member at a point intermediate of said spherical surfaces so that spherical surfaces are above and below the port;

a swivel cap having a bore in communication with said central bore through said ball member and a mating seat engaging said ball member;

a tubular housing having an inner mating seat engaging said ball member and surrounding said swivel cap and said ball member, said tubular leg extending through said housing;

means for retaining the mating seats of said swivel cap and said tubular housing in firm engagement with said ball member's spherical surfaces and permitting pivotal and rotational movement of said cap and said housing relative to said ball member;

an annular chamber defined by said ball member, said swivel cap and said housing in communication with the exterior of said ball port during said pivotal and rotational movement;

means for sealing said annular chamber from said central bore during said pivotal and rotational movement;

means for communicating with said annular chamber, contained within said swivel cap and said housing, to provide fluid communication from beyond said cap and said housing to said chamber;

a passage in communication with said ball member port separate from said central bore, and extending through said tubular leg; and means for limiting said pivotal movement of said swivel cap and said housing with respect to said ball member to maintain communication between said ball port and said communication beyond said cap and said housing; and a pump intake connected to the other side of said swivel joint having its intake passage in communication with the central bore through said swivel joint.

* * * * *

UNITED STATES PATENT OFFICE
CERTIFICATE OF CORRECTION

Patent No. 4,128,127    Dated December 5, 1978

Inventor(s) Donald F. Taylor

It is certified that error appears in the above-identified patent and that said Letters Patent are hereby corrected as shown below:

Column 2, line 8, after "interior" insert -- socket member --.

Signed and Sealed this

Twenty-sixth Day of February 1980

[SEAL]

Attest:

Attesting Officer

SIDNEY A. DIAMOND

Commissioner of Patents and Trademarks